United States Patent [19]

Allen

[11] Patent Number: 4,746,935
[45] Date of Patent: May 24, 1988

[54] MULTITONE INK JET PRINTER AND METHOD OF OPERATION

[75] Inventor: Ross R. Allen, Ramona, Calif.

[73] Assignee: Hewlett-Packard Company, Palo Alto, Calif.

[21] Appl. No.: 801,030

[22] Filed: Nov. 22, 1985

[51] Int. Cl.$^4$ ............................................. G01D 15/16
[52] U.S. Cl. .................................. 346/140 R; 358/298
[58] Field of Search .......................... 346/140, 75, 1.1; 358/298, 283, 75, 78

[56] References Cited

U.S. PATENT DOCUMENTS

| | | | |
|---|---|---|---|
| 3,476,874 | 11/1969 | Loughren | 346/75 X |
| 3,747,120 | 7/1973 | Stemme | 346/140 X |
| 3,864,696 | 2/1975 | Fischbeck | 346/140 |
| 4,251,824 | 2/1981 | Hara | 346/140 |
| 4,353,079 | 10/1982 | Kawanabe | 346/140 |
| 4,490,728 | 12/1984 | Vaught | 346/140 X |
| 4,494,128 | 1/1985 | Vaught | 346/140 |
| 4,499,479 | 2/1985 | Lee | 346/140 |
| 4,538,160 | 8/1985 | Uchiyama | 346/140 |
| 4,540,996 | 9/1985 | Saito | 346/140 |
| 4,604,654 | 8/1986 | Sakurada | 358/298 |

FOREIGN PATENT DOCUMENTS 3009333 9/1981 Fed. Rep. of Germany .
54-133338 10/1979 Japan .

Primary Examiner—Joseph W. Hartary
Attorney, Agent, or Firm—William J. Bethurum

[57] ABSTRACT

This patent application discloses a method and apparatus useful for eight-level halftone thermal ink jet printing by printing with droplets of ink with volumes weighted in a binary sequence. Three (3) binary-weighted drop generators which are fired in sequence are useful in an eight-level, four color printing process and additionally may be employed with a clear ink vehicle drop generator in order to reduce optical density of single small dots in a given pixel area to thereby reduce grainyness.

This method and apparatus are also adapted for four color printing with a chosen number of rows of binary-weighted drop generators, including untoned vehicle if desired, in order to achieve color printing of pixels having desired color and optical density.

3 Claims, 5 Drawing Sheets

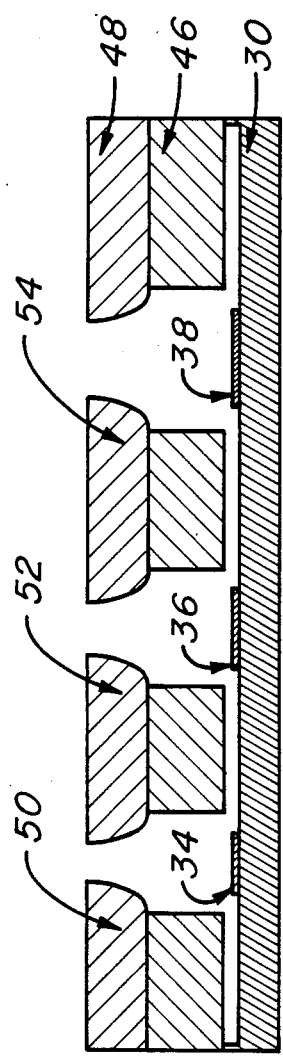
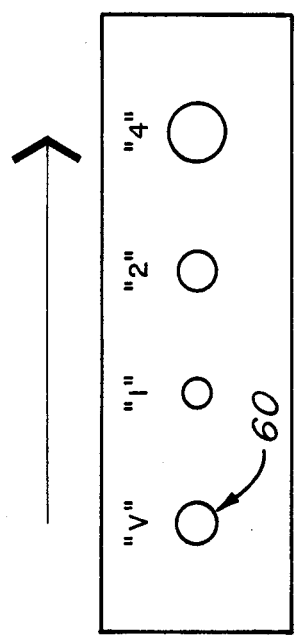
Fig. 3B
Fig. 4A

MULTITONE INK JET PRINTER AND METHOD OF OPERATION

TECHNICAL FIELD

This invention relates generally to thermal ink jet printers and more particularly to a multitone ink jet printer and method having an improved grey scale operation.

BACKGROUND ART

Thermal ink jet printing has been described in many recent technical articles, such as an article by Kuhn & Myers in *Scientific American,* 1985, at pages 162 through 178, and also in an article by J. B. Angell et al. also in *Scientific American* April 1983 at pages 44 through 55, both incorporated herein by reference.

In the art of multitone ink jet printing, one approach to printing a dot with one of eight grey scale levels is to employ a single ink jet drop generator and fire it from one (1) to seven (7) times at a given pixel in order to provide the pixel from one to seven levels of ink drop volume. However, this approach suffers at least two distinct disadvantages when used in a thermal ink-jet printer. The first of these disadvantages is that the substantial repeated use of single drop generator and its associated heater resistor increases the wear and failure rate (decreased lifetime) of the thermal ink jet print head. As used herein, the term "wear" is defined as the accumulation of drop ejection cycles in a drop generator with finite lifetimes. Such lifetimes are typically measured in tens of millions of cycles.

Secondly, when ink is ejected in a drop sequence from a single drop generator, there is a certain recovery time related to the bubble collapse associated with each ink drop ejection from the drop generator. This recovery time obviously imposes a limitation on the maximum achievable rate at which pixels are printed using this method of thermal ink jet printing.

Another approach to multitone ink jet printing involves the use of multiple ink jet drop generators and firing these drop generators simultaneously in different numbers to achieve different corresponding ink jet drop volumes. To some extent, the use of these multiple drop generators as contrasted to a single drop generator can increase the lifetime of the thermal ink jet printer. One such approach is disclosed for example by T. Kawanabe in U.S. Pat. No. 4,353,079 issued Oct. 5, 1982. However, the thermal ink jet recorder apparatus of the Kawanabe patent identified above is possessed with certain other disadvantages related to the requirement for simultaneous firing of the multiple drop generators therein.

In particular, since these drop generators of the prior art are simultaneously fired at a single location, the nozzles must be critically aligned with respect to each other so that the ink drops will properly register within the pixel on the recording medium (paper). Furthermore, this alignment is predicated upon a particular spacing between the nozzles and paper, and maintaining this distance is critical to achieving a simultaneous combination of these drop volumes on the pixel. In addition, since each drop generator in the Kawanabe recorder of U.S. Pat. No. 4,353,079 produces only one unit volume of ink, then anywhere up to seven drop generators must be fired simultaneously to achieve the variation of one to seven levels on the grey scale. This requirement significantly increases the complexity, cost and unreliability of printhead design, and it also increases the total drop generator-use time for the print head and, again, imposes a limitation on the useful print head lifetime.

DISCLOSURE OF INVENTION

The general purpose of this invention is to provide a new and improved thermal ink jet printer and method of operation which overcomes the aforedescribed disadvantages of the prior art and consequently provides a print head of decreased drop generator design complexity and characterized by an extended lifetime.

To accomplish this purpose, I have discovered and developed an improved multitone ink jet printer and method wherein a plurality of ink drop volumes are provided in a drop generator structure and are weighted in a predetermined binary sequence. The drop generators which are each assigned a binary number corresponding to a specific ink drop volume are sequentially fired at a chosen pixel as they come into alignment with the pixel as the printhead moves with respect to the paper or vice versa. Thus, firing one to three binary-weighted drop generators produces 1 to 7 volume units of ink within the pixel. This process produces 1-8 levels of grey scale. The total number of drop generators required in the print head and the total drop generator use time is minimized to thereby maximize print head lifetime with a minimum of associated drop generator design complexity.

In an alternative embodiment of the invention, there is disclosed and claimed a method for reducing the optical density of ink ejected into a given pixel area during a halftoning printing operation. This method includes ejecting a drop of untoned liquid, termed "ink vehicle" in the art, into a given area of a pixel and also ejecting one or more drops of ink with a fixed dye loading into the same area of the pixel. In this manner, the dye is dispersed over a larger area, and the objectionable optical characteristics of single, small, high-contrast dots standing alone are eliminated in favor of a more uniform gray tone.

BRIEF DESCRIPTION OF DRAWINGS

FIGS. 3A and 3B illustrate isometrically, and in cross-section respectively, a print head structure constituting a preferred embodiment of the invention.

FIGS. 4A–4E illustrate schematically an alternative embodiment of the invention wherein untoned ink vehicle is combined with an ink drop of fixed dye loading. This process is carried out in order to obtain a mixture of ink vehicle and ink on paper to produce a reduction in optical density of the fixed dye loading to thereby eliminate grainyness of small dots.

BEST MODE FOR CARRYING OUT THE INVENTION

Figure 1D:
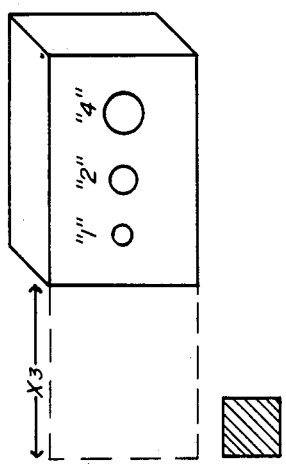
FIGS. 1A–1D are sequential isometric views looking up through the paper at the bottom of a scanning printhead having the "1", "2" and "4" binary volumes for ejecting ink into a given pixel.
Figure 1C:
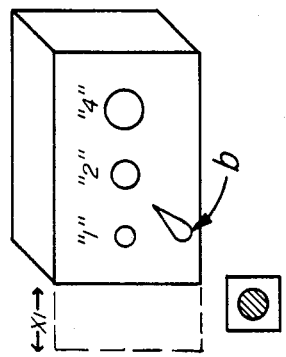
Figures 1A, 1B:
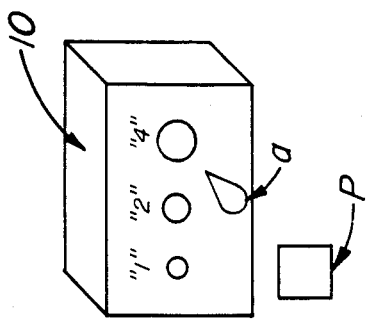

Referring now to FIGS. 1A–1D, there is shown in sequence the firing of the binary-weighted "4", "2" and "1" volume ink drops at the pixel p. The direction of scan for a printhead 10 is from left to right, and the "4" volume ink drop "a" has printed into the pixel at displacement $x_1$. As indicated in FIG. 1B, the "2" volume drop "b" is on its way toward the pixel where it subsequently combines with the "4" volume drop to provide a "4"+"2" combined volume spot on the pixel at displacement $x_2$ as indicated in FIG. 1C. Also shown in FIG. 1C is the firing of the "1" volume ink "c" which combines with the already deposited "4"+"2" volumes of ink to give a 7 volume ink spot or level eight on the grey scale and completely covering the pixel as indicated in FIG. 1D at displacement $x_3$.

There is much less critical alignment with the drop generator scheme of the present invention than with the approach of firing seven drop generators simultaneously. Furthermore, since there are only three drop generators for the eight grey levels rather than the seven drop generator scheme of the prior art, this feature results in a simpler electrical interconnect requirement for the printhead heater resistors, less complex driver electronics, a less complex plumbing scheme for feeding ink to the three drop generators, and a more compact and reliable printhead.

Figure 2:
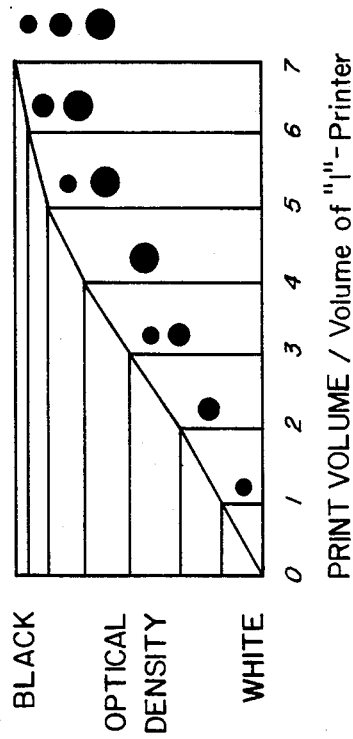
FIG. 2 is a graph of optical dot density versus print volume for the binary drop generator depicted in FIGS. 1A–1D.

Referring to FIG. 2, the scheme whereby combined ink drops with total volumes "1" through "7" produce eight grey levels is described. This figure shows how optical density of a pixel is increased from the reflectivity of the untoned paper ("white") to the reflectivity of ink covering the paper ("black") as successively larger volumes of ink are applied to the region of a single pixel. The curve in the figure obeys a typical relation between spot area and drop volume on a coated paper, and the total optical density of the pixel is computed from the reflectivities and areas of the tones and untoned regions within a pixel boundary. Next to each print volume derived from the "1", "2", and "4" binary-weighted dot printers is shown schematically the combination of drops producing this volume.

Figure 3A:
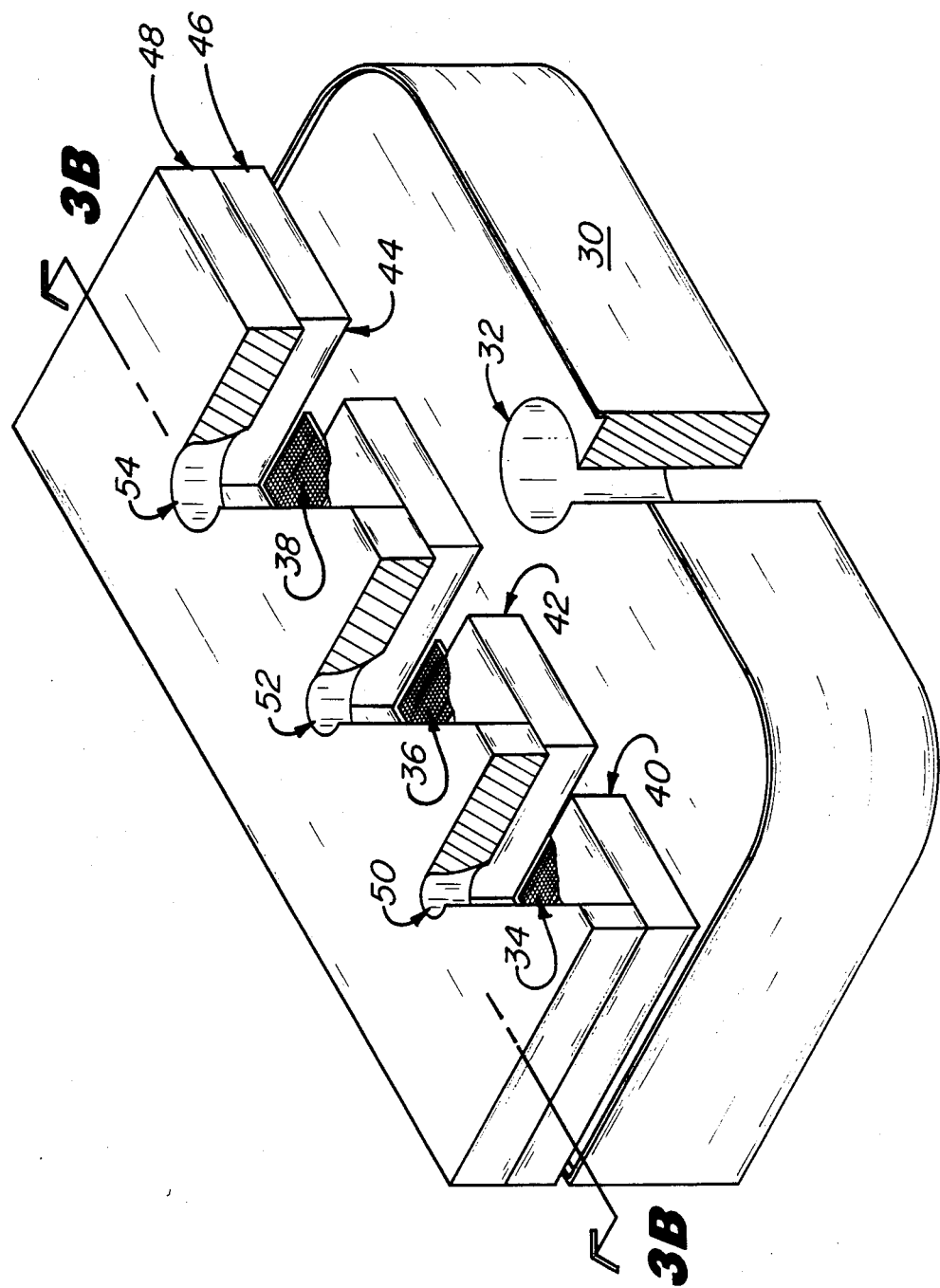

Referring now to FIGS. 3A and 3B, the partially cut-away isometric view of a printhead employing the three drop generator scheme of the present invention includes a silicon thin film resistor substrate 30 which is fabricated using silicon planar processing and thin film deposition techniques which are well known to those skilled in the art. The silicon substrate 30 includes a common ink feed-hole 32 in the form of a cylinder or slot through substrate 30 and configured using diamond saw blade or laser drilling techniques. As is also well known, the thin film resistor silicon substrate 30 is constructed to have a plurality of heater resistors 34, 36 and 38 thereon, and these resistors are configured to correspond to the different "1", "2" and "4" volume ink channels 40, 42 and 44 in the barrier layer 46. This barrier layer 46 isolates individual drop generators to reduce crosstalk and is important to obtaining long operating life for the thermal ink jet resistors. Typically the barrier layer 46 is fabricated from a well known commercial polymer material with the trade name "VACREL", nickel, glass, or some other material impervious to attack by the liquid ink contained therein.

The printhead in FIG. 3A further includes a drop generator orifice plate 48 typically constructed of nickel and includes the plurality of orifices 50, 52 and 54 for ejecting the "1", "2" and "4" binary ink volumes, respectively. These orifices 50, 52 and 54 will emit the "1", "2" and "4" volumes of ink when their corresponding thin-film resistors 34, 36 and 38 respectively are heated by the application thereto of current pulses. The means by which the ink bubble forms on the heater resistor and provides the energy to eject a droplet of ink is well known to those skilled in the thermal ink jet printing art, and is described, for example, in the *Hewlett Packard Journal*, Volume 36, Number 5, May 1985 which is incorporated herein by reference. These current pulses are applied by way of conventional surface metallization patterns (not shown), but typically consisting of very thin conductive traces of aluminum or gold on the upper surface of the silicon substrate 30 and deposited using standard evaporation processes well known in the art.

Although the substrate member 30 is referred to herein as a "silicon substrate", it will be understood by those skilled in the art that the substrate 30 will typically by a thin film composite or layered structure wherein a first layer of silicon dioxide $SiO_2$, will be grown or deposited on a silicon substrate surface to provide surface pasivation thereof, and then a resistive layer such as tantalum-aluminum will be deposited on the $SiO_2$ layer. Next the conductive trace material will be evaporated on the tantalum-aluminum layer and lithographically defined so that openings in this trace material define the boundaries of the heater resistors. Finally, a inert outer passivation or barrier layer material such as silicon carbidej, SiC or silicon nitride, $Si_3N_4$, or tantalum pentoxide, $Ta_2O_5$, or combination thereof in successive layers is formed on the surface of the aluminum trace material and the exposed heater resistors in order to provide a good isolation barrier layer between the heater resistors and the ink in the reservoirs above these heater resistors. This inert barrier layer is necessary due to the highly corrosive nature of the ink and also because of their cavitation produced wear during ink ejection from the drop generators. Therefore, as used herein, "silicon substrate" is intended to mean a thin film resistor silicon substrate of the above type of layered structure.

Figure 4B:
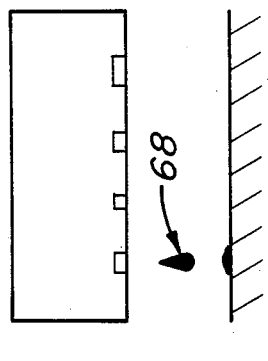
Figure 4C:
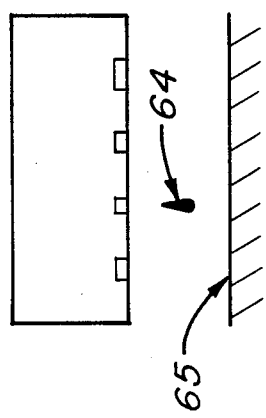
Figure 4D:
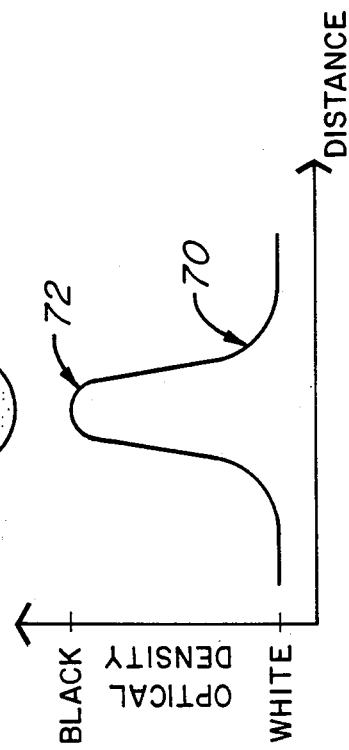
Figure 4E:
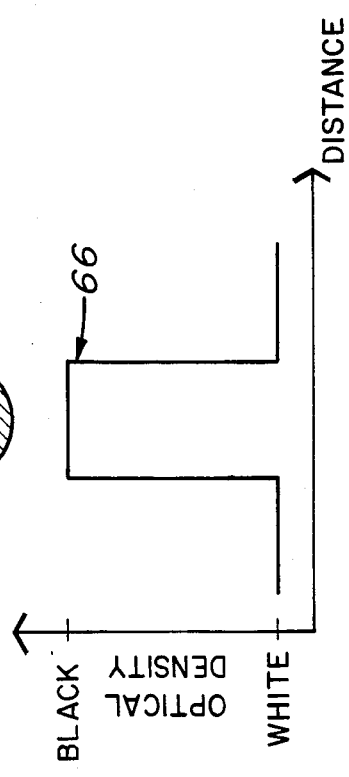

Referring now to FIGS. 4A through 4E, there is illustrated an alternative embodiment of my invention which includes an additional drop generator which is indicated as drop generator 60 in FIG. 4A. This generator 60 produces untoned droplets of fluid which is the ink without toning dyes. This liquid is known in the art as the ink vehicle. The volume of the untoned drop will be between the "1" and "4" volume. When a single toned ink drop 64 is ejected from the printhead onto the paper 65 as indicated in FIG. 4B, it will typically exhibit an optical density profile in the form indicated in FIG. 4C. In this Figure, reference number 66 indicates the optical density profile across the diameter of printed dot 67. As a result of the sharp steep profile 66 of optical density at the edge, the dot 67 in FIG. 4C, when seen at a normal viewing distance, will produce a grainylike characteristic as perceived by the eye and will consequently result in undesirable shading or grainyness for certain image printing and background applications—particulary in the reproduction of highlights in continuous-tone images. Thus, it is frequently desirable to remove this grainylike characteristic and this may be accomplished by the utilization of an untoned liquid vehicle drop 68 as indicated in FIG. 4D. This vehicle drop 68 is ejected onto the same pixel area as the toned ink drop 64 and this produces a certain quantity of vehicle volume plus "1" toned ink volume in area 69 as indicated in 4E and having an optical density profile 70 which has a maximum value in the center portion 72 thereof and then decreases out to the edges of the toned area 69.

Figure 5A:
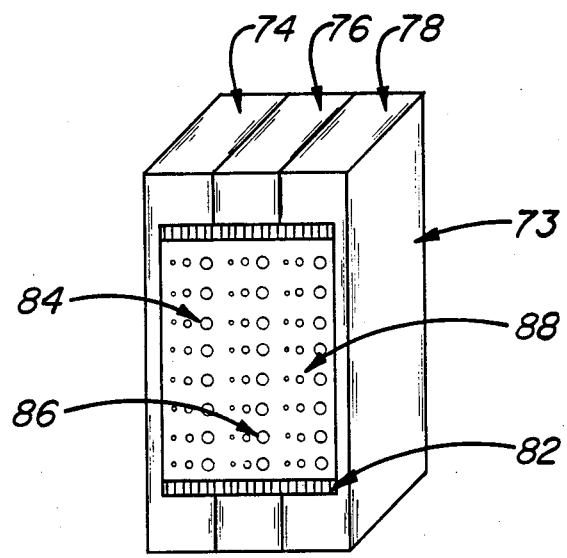
FIGS. 5A and 5B illustrate isometrically and in plan view, respectively, a three-color, eight-level halftone printer in accordance with the present invention.
Figure 5B:
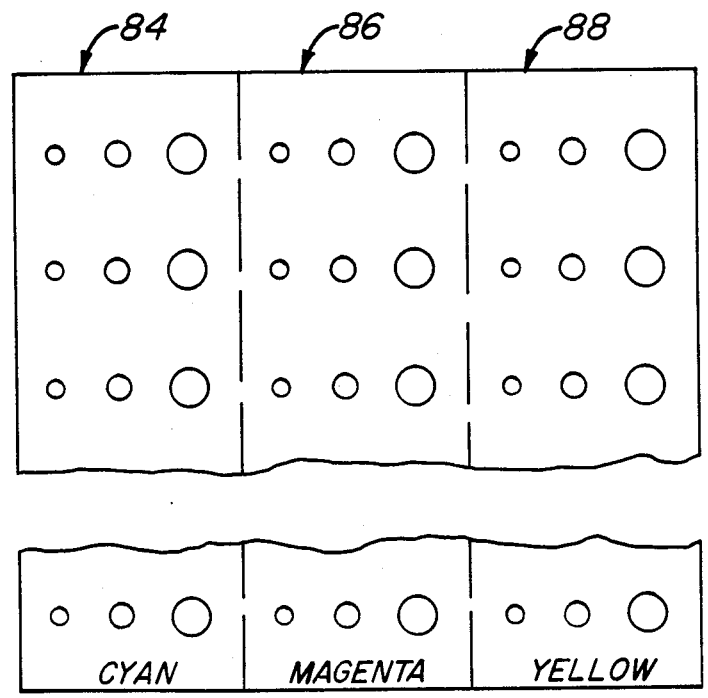

Referring now to FIGS. 5A and 5B, there is shown, in isometric and plan views respectively, a threecolor, eight-level halftone printhead 73 including three foam filled reservoirs 74, 76 and 78 of the type disclosed and claimed in co-pending application Ser. No. 880,774 of Jeffrey Baker, assigned to the present assignee. These foam filled reservoirs 74, 76 and 78 are filled with inks having dye colors of cyan, magenta and yellow, respectively for subtractive color printing. These reservoirs 74, 76 and 78 are connected using known fluid interconnect techniques to an outer orifice plate 82 with the cyan, magenta and yellow orifice patterns 84, 86 and 88, respectively. The orifice patterns 84, 86 and 88 are shown in an enlarged plan view in FIG. 5B and include n-rows of the "4", "2", "1" binary drop generators in each of the cyan, magenta and yellow columns as indicated. Thus, each of the cyan, magenta and yellow columns may have as many n-rows of "4", "2", "1" binary drop generators as may be necessary to provide a desired quantity of these side by side ink dispensers for an eight-level three-color halftoning printing operation. Additionally, each of the n-rows may be modified to include a single clear fluid or ink vehicle drop generator (not shown) if it becomes desirable for some reason to diffuse one or more of the colors produced in order to reduce edge sharpness of isolated, color printed dots. This may be desirable for example when printing color dots (in the manner described previously to provide a more uniform coverage of a colored region within a pixel).

Various modifications may be made in the above-described embodiments without departing from the spirit and scope of this invention. For example, the present invention is not limited specifically to the "4", "2", "1" binary sequence indicated, and instead may employ variations of this binary sequence in accordance with the particular type of grey level imaging operation being performed. In addition, multicolor printing may be produced by individual color pens (cyan, yellow, magenta, black) registered and aligned with respect to one another so as to print successively within the boundary of a single pixel to produce mixing of drops of various volumes and colors. Furthermore, the present invention is not limited to the particular 3-color printhead of FIG. 5 wherein the different colors are all located in adjacent columns in an integrated ink storage and orifice plate structure. Instead, the cyan, magenta, yellow and black inks and black printers may reside in separate self contained units (pens) spaced apart by a chosen distance compatible with a particular color printing application.

I claim:

1. A scanning printhead for ejecting ink drops into pixels in a predetermined binary sequence of drop volumes including, in combination:
    (a) a thin film resistor substrate having a plurality of thin-film heater resistors thereon for generating vapor bubbles in the ink to effect the generation of ink-droplets,
    (b) a barrier layer disposed on said thin film resistor substrate and having a plurality of channels defining a plurality of different binary drop volumes and forming respectively a plurality of drop generators,
    (c) a drop generator orifice plate disposed on said barrier member and having respectively a plurality of different orifice diameters representative of said predetermined binary sequence of drop volumes and disposed respectively over said plurality of heater resistors and barrier channels, said orifices being in a row, whereby said drop generators may be sequentially fired by the application of electrical pulses to said heater resistors as said print head is scanned in relative motion with respect to ink receiving paper whereby ink drops can be ejected in said predetermined sequence.

2. The apparatus defined in claim 1 wherein said volumes produced by said drop generators are weighted in an approximate "1", "2", "4" binary sequence.

3. The apparatus defined in claim 2 wherein said printhead is provided with an additional clear untoned ink vehicle drop generator positioned in said row, said additional drop generator ejecting clear untoned ink vehicle drops for imparting to said print head an additional capability to remove graininess in said pixels.

* * * * *